US008697787B2

(12) United States Patent  
Chaudhary

(10) Patent No.: US 8,697,787 B2  
(45) Date of Patent: Apr. 15, 2014

(54) FLEXIBLE PVC COMPOSITIONS MADE WITH PLASTICIZERS DERIVED FROM RENEWABLE SOURCES

(75) Inventor: Bharat I. Chaudhary, Princeton, NJ (US)

(73) Assignee: Dow Global Technologies LLC, Midland, MI (US)

( * ) Notice: Subject to any disclaimer, the term of this patent is extended or adjusted under 35 U.S.C. 154(b) by 184 days.

(21) Appl. No.: 13/100,489

(22) Filed: May 4, 2011

(65) Prior Publication Data

US 2011/0272174 A1 Nov. 10, 2011

Related U.S. Application Data

(63) Continuation-in-part of application No. 12/821,556, filed on Jun. 23, 2010.

(60) Provisional application No. 61/332,848, filed on May 10, 2010, provisional application No. 61/247,383, filed on Sep. 30, 2009.

(51) Int. Cl.
*C08K 5/15* (2006.01)

(52) U.S. Cl.
USPC .......................................... 524/114; 524/519

(58) Field of Classification Search
USPC ................................................ 524/114, 519
See application file for complete search history.

(56) References Cited

U.S. PATENT DOCUMENTS

| | | | |
|---|---|---|---|
| 2,397,592 A | 4/1946 | Blades |
| 2,403,215 A | 7/1946 | Foster |
| 2,458,484 A | 1/1949 | Terry et al. |
| 2,500,918 A | 3/1950 | Rueter et al. |
| 2,618,622 A | 11/1952 | Grummitt et al. |
| 2,666,752 A | 1/1954 | Grummitt et al. |
| 3,138,566 A | 6/1964 | Arnold |
| 3,409,580 A | 11/1968 | Alzner et al. |
| 3,639,318 A | 2/1972 | Tijunelis et al. |
| 3,668,091 A | 6/1972 | French et al. |
| 3,712,875 A | 1/1973 | Tijunelis |
| 3,778,465 A | 12/1973 | Barnstorf |
| 3,780,140 A | 12/1973 | Hammer |
| 3,868,341 A | 2/1975 | Sauer et al. |
| 3,872,187 A | 3/1975 | Fath |
| 3,891,694 A | 6/1975 | Mills et al. |
| 4,083,816 A * | 4/1978 | Frankel et al. ................. 524/313 |
| 4,346,145 A | 8/1982 | Choi et al. |
| 4,421,886 A | 12/1983 | Worschech et al. |
| 4,426,477 A | 1/1984 | Yasumatsu et al. |
| 4,556,694 A | 12/1985 | Wallace |
| 4,605,694 A | 8/1986 | Walker |
| 4,612,192 A | 9/1986 | Scheuffgen et al. |
| 4,613,533 A | 9/1986 | Loomis et al. |
| 4,627,993 A | 12/1986 | Loomis |
| 4,670,494 A | 6/1987 | Semenza, Jr. |
| 4,857,600 A | 8/1989 | Gross et al. |
| 5,225,108 A | 7/1993 | Bae et al. |
| 5,227,417 A | 7/1993 | Kroushl |
| 5,246,783 A | 9/1993 | Spenadel et al. |
| 5,270,366 A | 12/1993 | Hein |
| 5,278,236 A | 1/1994 | Case et al. |
| 5,430,108 A | 7/1995 | Schlosberg et al. |
| 5,454,806 A | 10/1995 | Shinonome |
| 5,464,903 A | 11/1995 | Hofmann |
| 5,466,267 A | 11/1995 | Baillargeon et al. |
| 5,495,033 A | 2/1996 | Basu et al. |
| 5,575,965 A | 11/1996 | Caronia et al. |
| 5,736,605 A * | 4/1998 | Oshima ........................ 524/521 |
| 5,756,570 A | 5/1998 | Hoch et al. |
| 5,886,072 A | 3/1999 | Linsky et al. |
| 6,063,846 A | 5/2000 | Weng et al. |
| 6,114,425 A | 9/2000 | Day et al. |
| 6,274,750 B1 | 8/2001 | Sato et al. |
| 6,417,260 B1 | 7/2002 | Weng et al. |
| 6,437,170 B1 | 8/2002 | Thil et al. |
| 6,451,958 B1 | 9/2002 | Fan et al. |
| 6,496,629 B2 | 12/2002 | Ma et al. |
| 6,608,142 B1 | 8/2003 | Weng et al. |
| 6,706,815 B2 | 3/2004 | Marchand et al. |
| 6,714,707 B2 | 3/2004 | Rossi et al. |
| 6,734,241 B1 | 5/2004 | Nielsen et al. |
| 6,797,753 B2 | 9/2004 | Benecke et al. |
| 6,849,694 B2 | 2/2005 | Hata |
| 6,949,597 B2 | 9/2005 | Nielsen et al. |
| 7,700,675 B2 | 4/2010 | Bueno de Almeida et al. |
| 2002/0013396 A1 | 1/2002 | Benecke et al. |

(Continued)

FOREIGN PATENT DOCUMENTS

| | | |
|---|---|---|
| CA | 1188445 A1 | 6/1985 |
| CN | 1341681 | 3/2002 |

(Continued)

OTHER PUBLICATIONS

Danisco, Grindsted Soft-n-Safe brochure (date unknown).
Vertellus Performance Materials Inc.; Flexricin P-8 Technical Data Sheet, Nov. 2006.
Grummitt et al., Acetylated Castor Oil Industrial and Engineering Chemistry, vol. 37, No. 5, May, 1945, pp. 485-491.
Orellana-Coca et al., Journal of Molecular Catalysis B: Enzymatic 44 (2007) 133-137.
Du et al., JAOCS, vol. 81, No. 4 (2004) 477-480.
Sheehan et al, A Look Back at the U.S. Department of Energy's Aquatic Species Program: Biodiesel from Algae, National Renewable Energy Laboratory, Colorado, Jul. 1998, pp. 1-294.

(Continued)

*Primary Examiner* — Peter D Mulcahy
(74) *Attorney, Agent, or Firm* — Whyte Hirschboeck Dudek S.C.

(57) ABSTRACT

PVC resin-based compositions that include biochemical plasticizers as the primary plasticizers are provided. The compositions include PVC resin, a compatibilizer, one or more biochemical plasticizers and, optionally, a thermoplastic elastomer impact modifier. The biochemical plasticizers are present in substantial quantities in the compositions and, in some embodiments, are the only plasticizers present in the compositions.

19 Claims, 1 Drawing Sheet

(56) References Cited

U.S. PATENT DOCUMENTS

| | | |
|---|---|---|
| 2004/0122159 A1 | 6/2004 | Mhetar et al. |
| 2005/0090590 A1 | 4/2005 | Nielsen et al. |
| 2005/0203230 A1 | 9/2005 | Kadakia et al. |
| 2006/0025544 A1 | 2/2006 | Koube et al. |
| 2007/0100049 A1 | 5/2007 | Ishizuka et al. |
| 2007/0135562 A1 | 6/2007 | Freese et al. |
| 2008/0200595 A1 | 8/2008 | Hinault et al. |
| 2008/0227993 A1 | 9/2008 | Zuckerman |
| 2009/0149585 A1 | 6/2009 | De Quadros Junior et al. |
| 2009/0149586 A1 | 6/2009 | De Quadros Junior et al. |
| 2009/0312478 A1 | 12/2009 | Hasegawa et al. |
| 2010/0010127 A1 | 1/2010 | Barki et al. |
| 2010/0256278 A1 | 10/2010 | Harada et al. |
| 2011/0076502 A1* | 3/2011 | Chaudhary et al. ............ 428/418 |
| 2011/0272174 A1 | 11/2011 | Chaudhary |
| 2013/0005937 A1 | 1/2013 | Cramail et al. |

FOREIGN PATENT DOCUMENTS

| | | |
|---|---|---|
| CN | 101070510 | 11/2007 |
| CN | 101108982 | 1/2008 |
| CN | 101591588 | 12/2009 |
| CN | 101824193 | 9/2010 |
| CN | 101914219 | 12/2010 |
| EP | 0192961 A1 | 9/1986 |
| EP | 0358179 A2 | 3/1990 |
| EP | 0364717 A1 | 4/1990 |
| EP | 0393813 A1 | 10/1990 |
| EP | 0473915 A1 | 3/1992 |
| EP | 0565984 A1 | 10/1993 |
| EP | 1361039 | 11/2003 |
| EP | 0986606 B1 | 8/2004 |
| EP | 1218443 | 10/2005 |
| EP | 1624014 | 8/2006 |
| EP | 2070977 A2 | 6/2009 |
| EP | 2245089 A1 | 5/2012 |
| FR | 1437722 | 5/1966 |
| GB | 499931 | 1/1939 |
| GB | 790314 | 2/1958 |
| GB | 910543 | 11/1962 |
| GB | 934689 | 8/1963 |
| GB | 1022920 | 3/1966 |
| GB | 1102506 | 2/1968 |
| GB | 1300526 | 12/1972 |
| GB | 1341623 | 12/1973 |
| GB | 1415770 | 11/1975 |
| GB | 2155021 | 9/1985 |
| JP | S61-016950 | 1/1986 |
| JP | 04-059851 | 2/1992 |
| JP | H04-085354 | 3/1992 |
| JP | H04-261452 | 9/1992 |
| JP | 2000-319468 | 11/2000 |
| JP | 2003-064233 | 3/2003 |
| JP | 2003-297149 | 10/2003 |
| JP | 2004311064 | 11/2004 |
| JP | 2010-042669 | 2/2010 |
| WO | 9730115 | 8/1997 |
| WO | 0114466 | 3/2001 |
| WO | 01/98404 | 12/2001 |
| WO | 2004/052977 A1 | 6/2004 |
| WO | 2007006489 | 1/2007 |
| WO | 2008021330 | 7/2008 |
| WO | 2008081332 | 7/2008 |
| WO | 20081122364 A1 | 10/2008 |
| WO | 2009102877 A1 | 8/2009 |
| WO | 2011/041372 | 4/2011 |
| WO | 2011/041380 | 4/2011 |
| WO | 2011/041388 | 4/2011 |
| WO | 2013003225 A2 | 1/2013 |

OTHER PUBLICATIONS

Greenspan et al., Industrial and Engineering Chemistry, 445(12), 1953, pp. 2722-2726.
Thomson Scientific, Mar. 13, 2009, London, GB.
Greenspan et al., The Journal of the American Oil Chemists Society, 33, 1956, pp. 391-394.
Gan et al., European Polymer Journal, 31(8), 1994, pp. 719-724.
Rehberg et al., Ind. Eng. Chem., 44(9) 1952, pp. 2191-2195.
Taylor, Proceedings of the World Conference on Oilseed Technology and Utilization, American Oil Chemists Society, Champaign, 1992, pp. 152-165.
Tekin et al., JAOCS, 77(3), 2000, pp. 281-283.
Cai et al., Eur. J. Lipid Sci., Technol., 2008, 110, pp. 341-346.
Campanella et al., Chemical Engineering Journal, 144 (2008), pp. 466-475.
Santacesara et al, Chemical Engineering Journal, vol. 173, Issue 1, Sep. 1, 2011, pp. 198-209.
Senzana et al, Journal of the America! Oil Chemists Society, vol. 78, No. 7 (2001), pp. 725-731.
Haas, Fuel Processing Technology 86, 2005, pp. 1087-1096.
Freedman et al., JAOCS, 63(10), 1986, pp. 1375-1380.
Morgenstern, B., Epoxidized Fatty Acid Esters as Plasticizers for PVC presented at the 7th Freiberg Polymer Conference, Apr. 21-22, 2005.
Morgenstern, B., Use of Modified Fatty Acid Esters as Plasticizers for PVC dated Sep. 12, 2003.
Morgenstern, B., Epoxidized Fatty Acid Esters as Plasticizers for PVC dated Apr. 22, 2005.
Opposition filed against EP2245089 dated Jan. 9, 2013.
http://hebjingu.en.alibaba.com.
http://en.wikipedia.org/wiki/Chlorine.
http://en.wikipedia.org/wiki/Bleaching_of_wood_pulp.
TIC America, Online catalog: Tributrin; http://web.archive.org/web/200805111543071http://www.tciamerica.com/.
International Search Report and Written Opinion of PCT/US2009/033935 dated May 18, 2009.
International Preliminary Report on Patentability of PCT/US2009/033935 dated Aug. 26, 2010.
International Search Report and Written Opinion of PCT/US2010/050654 dated Nov. 9, 2010.
International Search Report and Written Opinion of PCT/US2010/050676 dated Jan. 12, 2011.
International Preliminary Report on Patentability of PCT/US2011/041557 dated Aug. 31, 2012.
International Search Report and Written Opinion of PCT/US2011/041557 dated Sep. 5, 2011.
International Preliminary Report on Patentability of PCT/US2011/050690 dated Jan. 12, 2012.
International Search Report and Written Opinion of PCT/US2010/050690 dated Feb. 8, 2011.
International Search Report and Written Opinion of PCT/US2011/045653 dated Oct. 7, 2011.
International Search Report and Written Opinion of PCT/US2012/043740 dated Jan. 23, 2013.
International Search Report and Written Opinion of PCT/US2012/055070 dated Dec. 3, 2012.
International Search Report and Written Opinion of PCT/US2013/023362 dated Mar. 28, 2013.
International Search Report and Written Opinion of PCT/US2010/050699 dated Nov. 8, 2010.
International Search Report and Written Opinion of PCT/US2011/035143 dated Aug. 26, 2011.

* cited by examiner

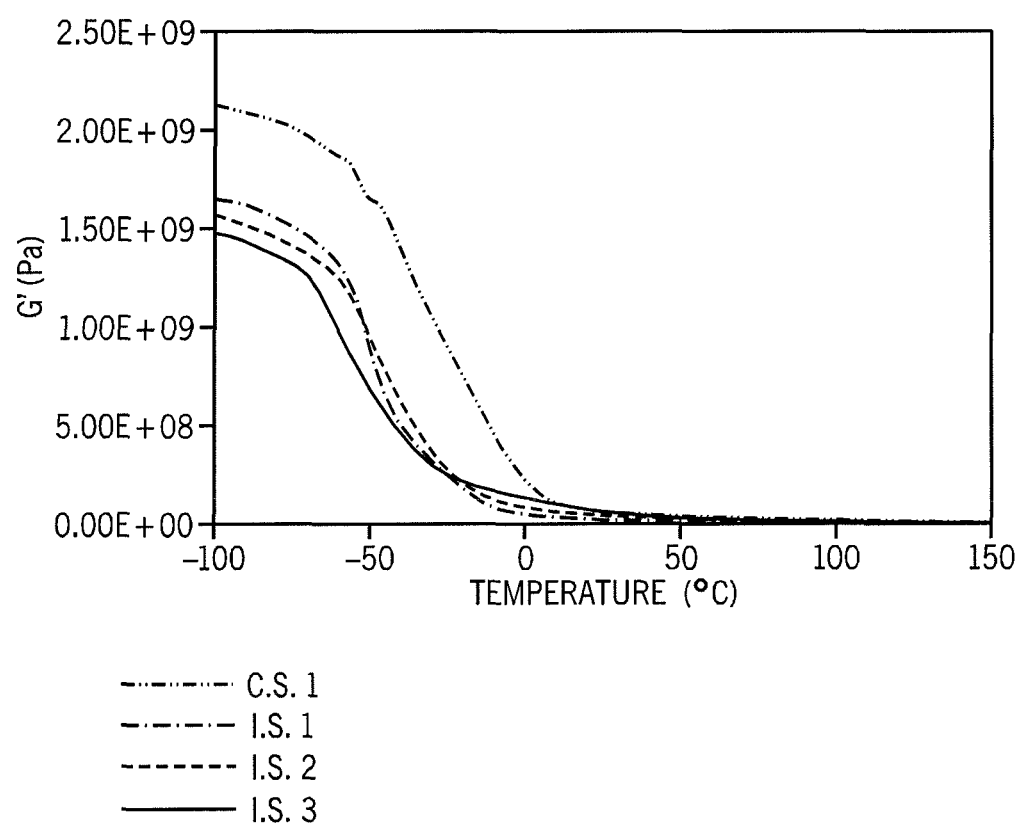

FLEXIBLE PVC COMPOSITIONS MADE WITH PLASTICIZERS DERIVED FROM RENEWABLE SOURCES

CROSS-REFERENCE TO RELATED APPLICATION

This application claims priority to U.S. Provisional Application No. 61/332,848, filed May 10, 2010. For purposes of United States patent practice, the contents of provisional application No. 61/332,848 are herein incorporated by reference. This application is a continuation-in-part of U.S. Ser. No. 12/821,556 filed on Jun. 23, 2010 which claims priority to U.S. Provisional Application No. 61/247,383 filed on Sep. 30, 2009.

FIELD OF THE INVENTION

This invention relates to polyvinyl chloride (PVC) compositions. In one aspect the invention relates to PVC compositions comprising biochemical plasticizers as the primary plasticizers while in another aspect, the invention relates to such compositions which are free of non-biochemical plasticizers.

BACKGROUND OF THE INVENTION

PVC compositions are well known in the art (see, for example, U.S. Pat. Nos. 6,063,846 and 6,608,142 and U.S. patent publication number 2005/0203230), and typically comprise PVC and at least one other polymer, e.g., a polyolefin, a styrenic polymer, etc. Since many of these other polymers are typically not miscible or otherwise compatible with PVC, often these compositions also include a compatibilizer, e.g., chlorinated polyethylene. PVC compositions that do not contain a plasticizer tend to be rigid and are suitable for the manufacture of rigid products such as pipe and tubing. PVC compositions that include a plasticizer tend to be flexible and are suitable for use in such applications as wire and cable insulation and jacketing, and medical device components. Examples of such compositions include the FLEX-ALLOY® products available from Teknor Apex.

Phthalic acid diesters (also known as "phthalates") are known plasticizers for PVC and other vinyl polymers. Examples of common phthalate plasticizers include di-isononyl phthalate (DINP), diallyl phthalate (DAP), di-2-ethylhexyl-phthalate (DEHP), dioctyl phthalate (DOP) and diisodecyl phthalate (DIDP). Other common plasticizers, used for high temperature applications, are trimellitates and adipic polyesters. Mixtures of plasticizers are often used to obtain optimum properties. Phthalate plasticizers have recently come under intense scrutiny by public interest groups that are concerned about the negative environmental impact of phthalates and potential adverse health effects in humans (especially children) exposed to phthalates.

Flexible PVC compositions made with plasticizers that are derived from renewable sources (i.e., biochemical plasticizers) are an alternative to petrochemical-based plasticizers. However, biochemical plasticizers can be inferior in certain respects to compositions made with plasticizers not derived from renewable sources (e.g., phthalate or trimellitate plasticizers) because they are insufficiently compatible with the PVC or because they have poor heat-aging properties. These disadvantages have limited the use of biochemical plasticizers, such as epoxidized soybean oil, to secondary plasticizers, lubricants or stabilizers, which are present in only small quantities in PVC-based compositions.

SUMMARY OF THE INVENTION

One aspect of the invention provides compositions comprising a polyvinyl chloride resin, a compatibilizer, and one or more biochemical plasticizers. In certain embodiments the compositions comprise 20 to 80 weight percent polyvinyl chloride resin, based on the total weight of the composition, 1 to 30 weight percent compatibilizer, based on the total weight of the composition, and 5 to 60 weight percent biochemical plasticizer, based on the total weight of the composition. In some such embodiments, the biochemical plasticizers comprise at least 50 weight percent of the total plasticizer content of the composition. In some embodiments, the compositions comprise at least 15 weight percent biochemical plasticizer, based on the total weight of the composition.

In some embodiments the compositions are substantially free of phthalate-based plasticizers. This includes compositions that are substantially free of any non-biochemical plasticizers.

In some embodiments the compositions further comprise a thermoplastic elastomer. In one such embodiment, the biochemical plasticizers comprise epoxidized fatty acid methyl ester, the thermoplastic elastomer is an olefin block copolymer, and the compatibilizer comprises a chlorinated polyethylene. In such an embodiment, the composition can have a tensile elongation at break retention of at least 25% after heat-aging for 168 hours at 113° C., as determined by ASTM D 638.

In some embodiments, the biochemical plasticizers comprise an acetylated castor wax and an epoxidized soybean oil and the compatibilizer comprises a chlorinated polyethylene. In these embodiments, the composition can exhibit a loop spew rating at 23° C. of slight or better, as determined by ASTM D 3291.

Another aspect of the invention provides wires or cables comprising a jacketing layer or an insulating layer comprising a composition in accordance with this invention.

BRIEF DESCRIPTION OF THE DRAWING

The FIGURE shows a graph of the dynamic modulus as a function of temperature for the comparative and inventive samples of Example 1.

DETAILED DESCRIPTION OF THE PREFERRED EMBODIMENT

The present invention provides PVC resin-based compositions that include biochemical plasticizers as primary plasticizers. The compositions include PVC resin, a compatibilizer, one or more biochemical plasticizers and, optionally, a thermoplastic elastomer impact modifier. The biochemical plasticizers are present in substantial quantities in the compositions and, in some embodiments, are the only plasticizers present in the compositions. The use of biochemical plasticizers is advantageous because, relative to more conventional petrochemical-based plasticizers, such as phthalates or trimetallitates, biochemical plasticizers are environmentally friendly and derived from renewable resources.

The present compositions overcome certain problems that have prevented various biochemical plasticizers from being used as the primary plasticizer in PVC resin-based compositions. For example, some embodiments of the compositions have sufficiently low tensile strengths and sufficiently high tensile elongation at break to render them suitable for use as primary (or only) plasticizers in applications where flexible PVC resins are desirable or required. Moreover, these compositions have improved heat-aging properties (e.g., improved tensile elongation retention) relative to compositions that include the same biochemical plasticizers as the primary (or only) plasticizers, but that lack the appropriate thermoplastic elastomer and compatibilizer.

In other embodiments, the compositions provide enhanced biochemical plasticizer compatibility, as measured by a loop spew test, relative to compositions that include the same biochemical plasticizers as the primary (or only) plasticizers, but that lack the appropriate compatibilizer. Furthermore, less biochemical plasticizer is required to achieve a given level of hardness.

Applications for the present compositions include jacketing and insulation for wires and/or cables, tubing, coatings, films, foams, and materials for automotive, medical, building and construction, pumps, footwear, gaskets, hoses, ropes, seals, and weather-stripping applications.

Biochemical Plasticizers

A "plasticizer" is a substance that lowers the modulus and tensile strength, and increases flexibility, elongation, impact strength, and tear-strength of the PVC resin to which it is added. A plasticizer may also lower the melting point of the PVC resin, lower the glass transition temperature and enhance processability of the PVC resin to which it is added.

Biochemical plasticizers are plasticizers that are derived from renewable, natural raw materials, such as plant oils. The compositions can include a single biochemical plasticizer or a blend of two or more biochemical plasticizers. U.S. Patent Application Publication No. 2010/0010127 describes biochemical plasticizers ("bioplasticizers") and methods of their production.

Epoxidized vegetable oils, such as epoxidized soybean oil and epoxidized linseed oil, are examples of biochemical plasticizers that can be included in the present compositions. For the purposes of this disclosure, a plasticizer is epoxidized if it contains at least one epoxide group. An "epoxide group" is a three-membered cyclic ether (also called oxirane or an alkylene oxide) in which an oxygen atom is joined to each of two carbon atoms that are already bonded to each other.

Esters of vegetable oil-derived fatty acids, such as epoxidized fatty acid methyl esters, are other examples of suitable biochemical plasticizers. Fatty acid esters can be derived from the reaction of an alcohol with fatty acids derived from renewable sources, such as plant oils. Epoxidized soybean fatty acid esters are an example of a suitable biochemical plasticizer belonging to this group.

Acetylated waxes and oils derived from plants are another class of biochemical plasticizers that can be included in the present compositions. Acetylated castor wax is an example of one suitable wax. Acetylated castor oil is an example of one suitable oil. Commercially available acetylated castor waxes, oils and other derivatives include FLEXRICIN® P-8 and PARICIN® 8, available from Vertellus Specialties, Inc. and Grindsted Soft-N-Safe, available from Danisco.

One or more biochemical plasticizers are used as primary plasticizers in the present compositions. For the purposes of this disclosure, plasticizers are primary plasticizers if they have sufficient miscibility or compatibility in the resin composition that they can be the majority, or even the sole, plasticizers in the composition. Thus, in some embodiments, biochemical plasticizers account for at least 50 percent by weight of the total plasticizer in the composition. In some embodiments of the compositions, biochemical plasticizers account for at least 90 percent by weight of the total plasticizer in the composition. Epoxidized derivatives of vegetable oils, acetylated derivatives of vegetable oils and mixtures thereof are particularly useful as biochemical plasticizers.

The compositions contain significant quantities of the biochemical plasticizers. For example, in some embodiments, the compositions include 5 to 60 weight percent biochemical plasticizer, based on the total weight of the composition. This includes embodiments in which the composition includes 7 to 50 weight percent biochemical plasticizer, based on the total weight of the composition, and further includes an embodiment in which the composition includes 10 to 40 weight percent biochemical plasticizer, based on the total weight of the composition.

In some embodiments, the compositions are free of plasticizers derived from petrochemicals, such as phthalates, trimetallitates, and adipic polyesters. The term "phthalate-free composition," as used herein, is a composition that is devoid of phthalate. A "phthalate," is a compound which includes the following structure (I):

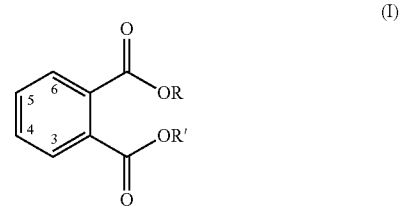

wherein R and R' may be the same or different. Each of R and R' is selected from a substituted-/unsubstituted-hydrocarbyl group having 1 to 20 carbon atoms. As used herein, the term "hydrocarbyl" and "hydrocarbon" refer to substituents containing only hydrogen and carbon atoms, including branched or unbranched, saturated or unsaturated, cyclic, polycyclic, fused, or acyclic species, and combinations thereof. Nonlimiting examples of hydrocarbyl groups include alkyl-, cycloalkyl-, alkenyl-, alkadienyl-, cycloalkenyl-, cycloalkadienyl-, aryl-, aralkyl, alkylaryl, and alkynyl- groups. Each position 3, 4, 5, and 6 may be populated by hydrogen or another moiety.

In some embodiments the compositions are substantially free of non-biochemical plasticizers. A composition is considered to be substantially free of non-biochemical plasticizers if the composition is free of non-biochemical plasticizer, or if the amount of non-biochemical plasticizer present in the composition is considered inconsequential to the efficacy of the composition.

Polyvinyl Chloride Resins

The polyvinyl chloride resin (also referred to as a vinyl chloride polymer) component of the present compositions is a solid, high molecular weight polymer that may be a polyvinyl chloride homopolymer or a copolymer of vinyl chloride having copolymerized units of one or more additional comonomers. A commercially available example of a PVC homopolymer is OxyVinyls 240F, available from OxyVinyls, LP. When present, comonomers will typically account for up to 20 weight percent of the copolymer. Examples of suitable comonomers include $C_2$-$C_6$ olefins, for example ethylene and propylene; vinyl esters of straight chain or branched $C_2$-$C_4$ carboxylic acids, such as vinyl acetate, vinyl propionate, and vinyl 2-ethyl hexanoate; vinyl halides, for example vinyl fluoride, vinylidene fluoride or vinylidene chloride; vinyl ethers, such as vinyl methyl ether and butyl vinyl ether; vinyl pyridine; unsaturated acids, for example maleic acid, fumaric acid, methacrylic acid and their mono- or diesters with $C_1$-$C_{10}$ mono- or dialcohols; maleic anhydride, maleic acid imide as well as the N-substitution products of maleic acid imide with aromatic, cycloaliphatic and optionally branched aliphatic substituents; acrylonitrile and styrene. Graft copolymers of vinyl chloride are also suitable for use in the compositions. For example, ethylene copolymers, such as ethylene vinyl acetate, and ethylene copolymer elastomers, such as EPDM (copolymers comprising copolymerized units of ethylene, propylene and dienes) and EPR (copolymers comprising copolymerized units of ethylene and propylene) that are grafted with vinyl chloride may be used as the vinyl chloride polymer component.

The compositions will typically include 20 to 80 weight percent polyvinyl chloride resin, based on the total weight of the composition. This includes embodiments in which the composition includes 25 to 75 weight percent polyvinyl chloride resin, based on the total weight of the composition and further includes embodiments in which the composition includes 30 to 60 weight percent vinyl chloride resin, based on the total weight of the composition.

Thermoplastic Elastomers

The compositions optionally include one or more thermoplastic elastomers which can act as impact modifiers. The inclusion of such elastomers can be desirable if the composition is intended for use in an application that requires significant flexibility. An "elastomer" is a rubber-like polymer which can be stretched to at least twice its original length and which retracts very rapidly to approximately its original length when the force exerting the stretching is released. An elastomer has an elastic modulus of about 10,000 psi (68.95 MPa) or less and an elongation usually greater than 200% in the uncrosslinked state at room temperature using the method of ASTM D638-72. A "thermoplastic elastomer" (TPE) is a material that has the properties of an elastomer but can be processed like a thermoplastic. TPEs are generally made by special block copolymerisation or graft polymerization or blending of two polymers. In each case the thermoplastic elastomer contains at least two segments, one of which is thermoplastic and the other elastomeric.

Thermoplastic polyolefin elastomers are examples of thermoplastic elastomers that are suitable for use in the present composition. "Polyolefin", "PO" and like terms mean a polymer derived from simple olefins. Polyolefin elastomer such as ethylene/alpha-olefin copolymers are copolymers of ethylene with at least one $C_3$-$C_8$ alpha-olefin (preferably an aliphatic alpha-olefin) comonomer, and optionally, a polyene comonomer, e.g., a conjugated diene, a nonconjugated diene, a triene, etc. Examples of the $C_3$-$C_8$ alpha-olefins include propene, 1-butene, 4-methyl-1-pentene, 1-hexene, and 1-octene. The alpha-olefin can also contain a cyclic structure such as cyclohexane or cyclopentane, resulting in an alpha-olefin such as 3-cyclohexyl-1-propene (allyl-cyclohexane) and vinyl-cyclohexane. Although not alpha-olefins in the classical sense of the term, for purposes of this invention certain cyclic olefins, such as norbornene and related olefins, are alpha-olefins and can be used in place of some or all of the alpha-olefins described above. Similarly, styrene and its related olefins (e.g., alpha-methylstyrene, etc.) are alpha-olefins for purposes of this invention. Exemplary copolymers include ethylene/propylene, ethylene/butene, ethylene/1-octene, ethylene/5-ethylidene-2-norbornene, ethylene/5-vinyl-2-norbornene, ethylene/-1,7-octadiene, ethylene/7-methyl-1,6-octadiene, ethylene/styrene and ethylene/1,3,5-hexatriene.

If the present compositions include a thermoplastic elastomer, they will generally comprise no greater than 40 weight percent thermoplastic elastomer, based on the total weight of the composition. This includes compositions that include no greater than 35 weight percent thermoplastic elastomer and further includes compositions that include no greater than 30 weight percent thermoplastic elastomer, based on the total weight of the composition. Typical ranges for the weight percentage of thermoplastic elastomer in the compositions, based on the total weight of the composition, are 10 to 40 weight percent, 15 to 35 weight percent and 20 to 30 weight percent.

FLEXALLOY®, available from Teknor Apex, is an example of a commercially available blend of PVC resin, thermoplastic elastomer and compatibilizer.

Compatibilizer

Compatibilizers are used to enhance the miscibility of the PVC resin and other polymer components, such as the thermoplastic elastomers. However, in the present compositions, the compatibilizer can also serve to compatibilize the biochemical plasticizers with the PVC resin to an extent sufficient to allow them to serve as the primary, or in some case, the only, plasticizers in the compositions. Therefore, in the present compositions the compatibilizers are useful even the absence of the thermoplastic elastomer component.

The compatibilizers can also act as impact modifiers in the compositions. For purposes of clarity, the weight percentages of thermoplastic elastomers mentioned above, do not include any thermoplastic elastomeric compatibilizers.

Examples of suitable compatibilizers include, but are not limited to, chlorinated polyolefins, ethylene vinylacetate copolymers, ethylene methyl acrylate copolymers, ethylene butyl acrylate copolymers, ethylene/acetate/carbon monoxide terpolymers, ethylene/acrylate/carbon monoxide terpolymers, polyvinylidene fluoride, nitrile butadiene rubber, epoxidized polybutadiene, epoxidized natural rubber, poly (tetramethylene oxide), glutarimide copolymers, thermoplastic polyurethane, and chlorinated polyurethane. The chlorinated polyolefin component of the compositions can be, for example, a) a chlorinated polyethylene homopolymer, b) a chlorinated copolymer that contains copolymerized units of i) ethylene and ii) a copolymerizable monomer, or c) a combination thereof. Representative chlorinated olefin polymers include a) chlorinated homopolymers of ethylene and b) chlorinated copolymers of ethylene and at least one ethylenically unsaturated monomer selected from the group consisting of $C_3$-$C_{10}$ alpha monoolefins; $C_1$-$C_{12}$ alkyl esters of $C_3$-$C_{20}$ monocarboxylic acids; unsaturated $C_3$-$C_{20}$ mono- or dicarboxylic acids; anhydrides of unsaturated $C_4$-$C_8$ dicarboxylic acids; and vinyl esters of saturated $C_2$-$C_{18}$ carboxylic acids. Chlorinated graft copolymers are included as well. Specific examples of suitable polymers include chlorinated polyethylene (CPE); chlorinated ethylene vinyl acetate copolymers; chlorinated ethylene acrylic acid copolymers; chlorinated ethylene methacrylic acid copolymers; chlorinated ethylene methyl acrylate copolymers; chlorinated ethylene methyl methacrylate copolymers; chlorinated ethylene n-butyl methacrylate copolymers; chlorinated ethylene glycidyl methacrylate copolymers; chlorinated graft copolymers of ethylene and maleic acid anhydride; and chlorinated copolymers of ethylene with propylene, butene, 3-methyl-1-pentene, or octene. The copolymers may be dipolymers, terpolymers, or higher order copolymers. Preferred chlorinated olefin polymers are chlorinated polyethylene and chlorinated copolymers of ethylene vinyl acetate. An example of a commercially available chlorinated polyethylene compatibilizer is TYRIN® 4211P CPE, available from The Dow Chemical Company.

When CPE is used as the compatibilizer, it is preferred that the CPE has a chlorine content of about 5% to about 50% by weight. The higher the chlorine content of the CPE, the better its miscibility or compatibility with the PVC. The compositions typically contain 1 to 30 weight percent compatibilizer, based on the total weight of the composition. This includes compositions that include 2 to 20 weight percent compatibilizer, based on the total weight of the composition, and further includes compositions that include 3 to 16 weight percent compatibilizer, based on the total weight of the composition.

Additional Filler and Additives

The compositions can additionally contain fillers. Particularly useful fillers include silica, clay, titanium dioxide, talc, calcium carbonate, and other mineral fillers. The compositions can additionally contain other compounding ingredients such as thermal- and light-stabilizers, blowing agents, lubricants, pigments, colorants, processing aids, antioxidants, crosslinking agents, flame-retardants, anti-drip agents, curing agents, boosters and retardants, coupling agents, antistatic agents, nucleating agents, slip agents, viscosity control agents, tackifiers, anti-blocking agents, surfactants, extender oils, acid scavengers, metal deactivators, and the like. The use of such additional components permits the compositions to be tailored for use in various applications. Particularly useful compounding ingredients include tin, lead, barium/zinc and calcium/zinc thermal stabilizers. If fillers and additives are present, they typically account for no greater than about 15 weight percent of the composition, based on the total weight of the composition. This includes compositions that include no greater than 10 weight percent and no greater than 5 weight percent fillers and additives, based on the total weight of the composition.

Composition Properties

Flexibility and Heat-Aging

The combination of PVC resin, appropriate compatibilizer, biochemical plasticizer and, optionally, thermoplastic elastomer can provide a composition that is sufficiently flexible, as measured by tensile elongation and strength, for use in a variety of applications, such as wire and cable applications, where flexibility is desirable. Thus, some embodiments of the compositions have a tensile strength of no greater than 4000 psi, as measured in accordance with ASTM D638. This includes compositions having a tensile strength of no greater than 3500 psi, no greater than 3000 psi, no greater than 2500 psi, no greater than 2000 psi, and even no greater than 1000 psi. These compositions can also have an elongation at break, as measured in accordance with ASTM D638, of at least 100%, at least 200%, at least 300%, or at least 400%. The measurements are conducted on dogbones cut from 30 mil thick plaques in accordance with UL 1581.

In some embodiments, the compositions have improved heat-aging properties relative to a composition that includes the PVC resin and the biochemical plasticizers in the absence of appropriate compatibilizers and thermoplastic elastomers. For example, a PVC resin-based composition that includes a combination of epoxidized fatty acid methyl ester and epoxidized soybean oil as the only plasticizers has a high tensile strength and a poor retention of tensile elongation after heat-aging, as illustrated in the comparative sample of Example 1, below. However, by including appropriate thermoplastic elastomers and compatibilizer, the tensile strength and heat-aging properties of the compositions can be significantly improved, as illustrated in the inventive samples of Example 1, below. Thus, in some embodiments, the compositions have a tensile elongation retention of at least 20%, at least 40%, or even at least 60% after heat-aging at 113° C. for 168 hours. For these same compositions, the inclusion of the biochemical plasticizer and the compatibilizer provide a reduced tensile strength increase after heat-aging. Thus, some embodiments of the compositions have a tensile strength increase of no greater than 190% after heat-aging at 113° C. for 168 hours. This includes compositions that have a tensile strength increase of no greater than 140% after heat-aging at 113° C. for 168 hours and further includes compositions have a tensile strength increase of no greater than 120% after heat-aging at 113° C. for 168 hours.

Plasticizer Compatibility

In some embodiments, an appropriate combination of compatibilizer and biochemical plasticizer makes it possible to incorporate biochemical plasticizer into the PVC resin with improved compatibility to provide a composition with greater flexibility than a comparable composition that lacks the appropriate compatibilizer. For example, a PVC resin-based composition that includes acetylated castor wax and epoxidized soybean oil and appropriate compatibilizers can exhibit improved compatibility relative to a composition that includes only the PVC resin and the biochemical plasticizers, as illustrated in Example 2, below.

Improved compatibility can be determined by a loop spew test at room temperature (23° C.) and/or after heat-aging. For the purposes of this disclosure, loop spew is measured in accordance with ASTM D 3291: Standard Test Method for Compatibility of Plasticizers in Poly(vinyl chloride) Plastics Under Compression which determines the compatibility of plasticizers in poly(vinyl chloride) plastics by rating the amount of plasticizer that spews due to compressional stress set up inside a 180° loop bend. Briefly, using this method, test specimens of plasticized poly(vinyl chloride) sheet are bent through an arc of approximately 180° and secured in a jig designed to hold them in the desired conformation. At specified intervals of time, a specimen is removed, bent 180° in the opposite direction, and the former inside of the loop is examined for evidence of plasticizer spew by visual inspection and by wiping the area with a dry index finger. Spew can be ranked as follows: (1) Completely dry in loop=none/0; (2) Slippery with slight amounts of oily substances on the inside of the loop=slight/1; (3) Slippery with moderate amounts of oily substances on the inside of the loop=moderate/2; and (4) Slippery with large amounts of oily substances on the inside of the loop=heavy/dripping/3.

Shore Hardness:

The present compositions can be characterized by their Shore hardness values as a measure of flexibility. For the purposes of this disclosure, Shore Hardness is measured in accordance with ASTM D2240. The Shore A scale can be used for 'softer' PVC resin compositions (e.g., compositions that include an elastomer impact modifier). Thus, some embodiments of the compositions have a Shore A hardness of no greater than 75. This includes compositions having a Shore A hardness no greater than 70 and further includes compositions having a Shore A hardness of no greater than 65. The Shore D scale is used for 'harder' PVC resin compositions (e.g., compositions that do not include an elastomer impact modifier). Thus, some embodiments of the compositions have a Shore D hardness of no greater than 55. This includes compositions having a Shore D hardness of no greater than 50 and further includes compositions having a Shore D hardness of no greater than 45.

Compounding

The polymeric compositions are generally prepared according to conventional dry blend or wet blend methods known to those skilled in the art of PVC compounding. The mixtures obtained from the blending process can be further compounded with a mixer such as a Banbury batch mixer, a Farrel Continuous Mixer, or a single or twin screw extruder.

In an embodiment, the present polymeric composition is made by absorption of the biochemical plasticizers in PVC powder to make a dry blend. Any suitable method/apparatus may be used to make the dry blend including, but not limited to, a Brabender mixer, a Henschel mixer or a ribbon blender. The polymeric composition may contain other additives in addition to the PVC and the biochemical plasticizer. The dry blend may then be further compounded (via melt extrusion for example) and formed into any desired shape (film, pellet, etc.).

Articles

Another aspect of the invention provides articles, such as molded or extruded articles, comprising one or more compositions of the present invention.

Articles include wire and cable jackets and insulation. Thus, in some embodiments, the article includes a metal conductor and a coating on the metal conductor to provide an "insulated" wire capable of electrical transmission. A "metal conductor," as used herein, is at least one metal component used to transmit either electrical power and/or electrical signals. Flexibility of wire and cables is often desired, so the metal conductor can have either a solid cross-section or can be composed of smaller wire strands that provide increased flexibility for the given overall conductor diameter. Cables are often composed of several components such as multiple insulated wires formed into an inner core, and then surrounded by a cable sheathing system providing protection and cosmetic appearance. The cable sheathing system can incorporate metallic layers such as foils or armors, and typically has a polymer layer on the surface. The one or more polymer layers incorporated into the protective/cosmetic cable sheathing are often referred to as cable "jacketing". For some cables, the sheathing is only a polymeric jacketing layer surrounding a cable core. There are also some cables having a single layer of polymer surrounding the conductors, performing both the roles of insulation and jacketing. The present compositions may be used as, or in, the polymeric components in a full range of wire and cable products, including power cables and both metallic and fiber optic communication applications.

EXAMPLES

The following examples illustrate embodiments of methods for making thermoplastic elastomer compositions in accordance with the present invention.

Example 1

Materials and Methods

The following materials are used in the comparative samples (CS) and inventive samples (IS) of Example 1. The PVC resin is OXY-VINYLS® 240F, a polyvinyl chloride homopolymer available from OxyVinyls, LP. The epoxidized fatty acid methyl ester (e-FAME) is VIKOFLEX® 7010, an epoxidized soybean fatty acid ester available from Arkema, Inc. The epoxidized soybean oil is PLAS-CHEK® 775, available from Ferro Corp. The thermoplastic elastomers are AFFINITY® EG8150, an ethylene-octene copolymer, and an olefin block copolymer (OBC) with a melt index of 0.5 g/10 min, a density of 0.866 g/cc, an 89/11 soft block/hard block ratio, and 18 mole percent ethylene, in the soft block. Both elastomers are available from The Dow Chemical Company. The compatibilizer is TYRIN® 2348P, a chlorinated polyethylene available from the Dow Chemical Company. Additives included in the composition are, HUBERCARB® Q1T, a calcium carbonate available from Akrochem Corp.; Mark® 6797, a calcium-zinc thermal stabilizer, available from Chemtura; and IRGANOX® 1076, a phenolic antioxidant, available from Ciba specialty chemicals. The formulation of the comparative sample and inventive samples are shown in Table 1.

TABLE 1

Formulations of C.S. 1 and I.S. 1-3

|  | C.S. 1 | I.S. 1 | I.S. 2 | I.S. 3 |
| --- | --- | --- | --- | --- |
| PVC (OXY-VINYLS 240F) | 63.7 | 33.7 | 33.7 | 33.7 |
| TYRIN CM2348P |  | 10 | 16 | 16 |
| AFFINITY EG8150 |  | 20 | 26 |  |
| VIKOFLEX 7010 | 24 | 24 | 12 | 12 |
| OBC |  |  |  | 26 |
| HUBERCARB Q1T | 6.4 | 6.4 | 6.4 | 6.4 |
| PLAS-CHEK 775 | 3.5 | 3.5 | 3.5 | 3.5 |
| Mark 6797 | 2.1 | 2.1 | 2.1 | 2.1 |
| IRGANOX 1076 | 0.3 | 0.3 | 0.3 | 0.3 |
| TOTAL (wt. %) | 100 | 100 | 100 | 100 |

The batches of the comparative and inventive samples are made by tumble blending the ingredients in a 40 cm$^3$ Brabender mixer set at 40 rpm. The mixer is not purged with nitrogen. Mixing is carried out by adding the polymers and other ingredients, and mixing at 175° C. for 5 minutes. The resulting compositions are removed from the mixer and compression molded into 30 mil thick plaques at 175° C. for 5 minutes.

Properties

Tensile strength and tensile elongation at break are measured on specimens at a rate of 2 inch/min, according to ASTM D638. The tensile strength and elongation are measured for three unaged samples, three samples aged at 113° C. for 168 hours, and three samples aged at 136° C. for 168 hours. The tensile strength retention and the tensile elongation retention are then calculated (as a percentage) for the aged samples.

Shore A hardness for the unaged samples is measured in accordance with ASTM D2240. The modulus from dynamic mechanical analysis is measured from −100° C. to +160° C. (at 5° C./min).

The data are shown in the FIGURE and Table 2.

TABLE 2

Properties of the Formulations of Table 1

|  | Unaged | Percent Retention after 168 h at 113° C. | Percent Retention after 168 h at 136° C. |
| --- | --- | --- | --- |
| Shore A |  |  |  |
| C.S. 1 | 82.8 | N/A | N/A |
| I.S. 1 | 60.8 | N/A | N/A |
| I.S. 2 | 74.8 | N/A | N/A |
| I.S. 3 | 70.3 | N/A | N/A |
| Tensile Strength (psi) |  |  |  |
| C.S. 1 | 2778 | 213 | 216 |
| I.S. 1 | 617 | 187 | 208 |
| I.S. 2 | 911 | 114 | 115 |
| I.S. 3 | 820 | 127 | 130 |

TABLE 2-continued

Properties of the Formulations of Table 1

|  | Unaged | Percent Retention after 168 h at 113° C. | Percent Retention after 168 h at 136° C. |
|---|---|---|---|
| Tensile Elongation (%) | | | |
| C.S. 1 | 325 | 1 | 4 |
| I.S. 1 | 326 | 26 | 15 |
| I.S. 2 | 409 | 47 | 29 |
| I.S. 3 | 346 | 67 | 33 |

Results

Comparative sample 1, which includes e-FAME and epoxidized soybean oil as the only plasticizers but does not include a compatibilizer or elastomer, exhibits a sharp deterioration in tensile properties after heat-aging at elevated temperatures. In contrast, the inventive samples 1 to 3, which include the same biochemical plasticizers in addition to a compatibilizer and polyolefin elastomers, are softer and result in better low temperature flexibility, as well as dramatically improved retention of tensile elongation after heat-aging.

Example 2

Materials and Methods

The following materials are used in the comparative samples (CS) and inventive samples (IS) of Example 2. The PVC resin is OXY-VINYLS 240F, a polyvinyl chloride homopolymer available from Oxy-Vinyls, LP. The epoxidized soybean oil is PLAS-CHEK® 775, available from Ferro Corp. The acetylated castor wax (ACW) is prepared as described below. The compatibilizer is TYRIN® 4211P, a chlorinated polyethylene available from the Dow Chemical Company. Additives included in the composition are, SATINTONE® SP-33, a calcined aluminosilicate available from BASF Corp.; BAEROPAN® MC 90249 KA, a mineral stabilizer, available from Baerlocher GmbH; and IRGANOX® 1076, a phenolic antioxidant, available from Ciba specialty chemicals. The specific formulations for the comparative and inventive samples are shown in Table 3.

TABLE 3

Formulations of C.S. 2 and I.S. 4-6

|  | C.S. 2 | I.S. 4 | I.S. 5 | I.S. 6 |
|---|---|---|---|---|
| PVC (OXY-VINYLS 240F) | 63.0 | 58.0 | 53.0 | 48.0 |
| ACW | 13.7 | 13.7 | 13.7 | 13.7 |
| SATINTONE ® SP-33 Clay | 6.4 | 6.4 | 6.4 | 6.4 |
| PLAS-CHEK 775 | 13.6 | 13.6 | 13.6 | 13.6 |
| BAEROPAN ® MC 90249 KA | 3.0 | 3.0 | 3.0 | 3.0 |
| IRGANOX ® 1076 | 0.3 | 0.3 | 0.3 | 0.3 |
| TYRIN ® 4211P |  | 5.0 | 10.0 | 15.0 |
| Total (wt. %) | 100.0 | 100.0 | 100.0 | 100.0 |

The acetylated castor wax (ACW) is prepared as follows. Castor wax (3700 g) is charged into a 5 liter (L) reactor. The reactor is fixed with a mechanical stirrer and common distillation glassware and is heated by an external bath to a temperature of 100° C. After melting the castor wax, acetic anhydride (1233 g) is added. The temperature falls to 84° C. and rises to 115° C. due to the exothermic reaction. The reaction temperature is maintained at 115° C. (inside) for over 8 hours. A vacuum pressure from 800 to 150 mbar is used to remove acetic acid until the Acid Number is lower than 3 mg KOH/g. A liquid product (ACW) is obtained. Table 4 sets forth the properties of the resulting ACW.

TABLE 4

Properties of the Acetylated Castor Wax

| Property | |
|---|---|
| Appearance at room temp. | Yellow Liq. |
| Iodine Value (IV) | 4 |
| Acid Number (AN) | 2.4 |
| Hydroxyl Number (OHN) | 0 |
| Solution Temperature | 194 |
| Weight Percent Water | 0.03 |
| Viscosity | |
| 25° C. | 345 |
| 40° C. | 150 |
| Density (g/cm$^3$) | 0.953 |

In Table 4, AN=acid number (mg KOH/g) is measured per DIN 53402; Density (@25° C.) is measured per DIN 51757; IV=Iodine value (g I$_2$/100 g) is determined by Deutsche Einheitsmethode DGF C-V 11a (53) or from technical data sheet; OHN=hydroxyl number (mg KOH/g) is measured per DIN 53240; Solution Temperature (° C.) is measured per DIN 53408; Viscosity (mPas) is measured per ASTM D445 Brookfield 25° C., 40° C.; and water wt. % is measured per DIN 51777.

The comparative and inventive samples are made as follows. The epoxidized soybean oil and the ACW are heated to 60° C. for 1 hour, stirred, and mixed together at a 50/50 weight percent concentration. A solids mixture is then formulated by mixing all of the dry ingredients, except the biochemical plasticizers and the clay filler, in a container using a spatula. Using a 40 cm$^3$ Brabender mixer with sigma blades at 90° C. and 40 rpm, the solids mixture is mixed for 30 seconds. The biochemical plasticizers are then added and mixing continues for 360 seconds (6 minutes). The clay filler is then added and mixing continues for 60 seconds. The mixer is then stopped and the resulting dry blend is removed.

The dry blend is then melt mixed using a 40 cm$^3$ Brabender mixer with cam rotors at 40 rpm, at 180° C. for 120 seconds. Batches of the resulting composition are compression molded into 30 mil thick plaques at 180° C. for 5 minutes.

Properties

Tensile strength and tensile elongation at break are measured on specimens at a rate of 2 inch/min, according to ASTM D638. The tensile strength (TS) and elongation (TE) are measured for three unaged samples, three samples aged at 113° C. for 168 hours, and three samples aged at 136° C. for 168 hours. The tensile strength retention (TSR) and the tensile elongation retention (TER) are then calculated (as a percentage) for the aged samples.

Shore D hardness for the unaged samples is measured in accordance with ASTM D2240.

Loop spew is measured for samples conditioned for 48 hours at 23° C. in accordance with ASTM D3291.

Spew is also measured by visually inspecting one-inch diameter samples aged for 7 days at 113° C. and 136° C.

Results:

The data for Example 2 are shown in Table 5. Inventive sample 4 (containing 5 wt. % CPE) generally exhibits less plasticizer spew than comparative sample 2 (i.e., plasticizer compatibility was improved for Example 4 by the addition of the compatibilizer). Examples 5 and 6 (containing 10 wt. %

CPE and 15 wt. % CPE, respectively) also exhibit relatively better performance, based on the loop spew test. Examples 4 to 6 are also softer than comparative example 2, indicating that the amount of plasticizer can be decreased to achieve the same hardness of the comparative example, which would result in less plasticizer spew at elevated temperatures.

TABLE 5

Properties of the Formulations of Table 3

|  | Shore (D) | TS unaged psi | TSR (%) after 113° C. Aging for 168 hours | TSR (%) after 136° C. Aging for 168 hours | TE unaged % | TER (%) after 113° C. Aging for 168 hours | TER (%) after 136° C. Aging for 168 hours | Loop Spew @ Room Temp. | Stress Whitening from Loop Spew Test | Spew after 113° C. aging | Spew after 136° C. aging |
|---|---|---|---|---|---|---|---|---|---|---|---|
| C.S. 2 | 45.2 ± 0.6 | 3623 ± 72 | 97 ± 3 | 91 ± 5 | 266 ± 12 | 96 ± 2 | 76 ± 12 | M | N | M | N |
| I.S. 4 | 42.9 ± 0.4 | 3211 ± 114 | 92 ± 4 | 94 ± 3 | 252 ± 2 | 100 ± 0 | 91 ± 1 | S | N | N | N |
| I.S. 5 | 41.0 ± 0.8 | 2078 ± 269 | 91 ± 13 | 96 ± 8 | 195 ± 18 | 94 ± 14 | 80 ± 11 | VS | S | H | S |
| I.S. 6 | 37.3 ± 0.1 | 1102 ± 176 | 118 ± 13 | 111 ± 16 | 108 ± 77 | 138 ± 367 | 108 ± 318 | N | M | M | S |

N = None; VS = Very Slight; S = Slight; M = Moderate and H = Heavy.

All references to the Periodic Table of the Elements refer to the Periodic Table of the Elements published and copyrighted by CRC Press, Inc., 2003. Also, any references to a Group or Groups shall be to the Group or Groups reflected in this Periodic Table of the Elements using the IUPAC system for numbering groups. Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent U.S. version is so incorporated by reference) especially with respect to the disclosure of synthetic techniques, product and processing designs, polymers, catalysts, definitions (to the extent not inconsistent with any definitions specifically provided in this disclosure), and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property is from 100 to 1,000, then the intent is that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure.

The terms "comprising", "including", "having" and their derivatives are not intended to exclude the presence of any additional component, step or procedure, whether or not the same is specifically disclosed. In order to avoid any doubt, all compositions claimed through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

"Composition" and like terms mean a mixture or blend of two or more components. "Blend" and like terms mean a blend of two or more polymers, as well as blends of polymers with various additives. Such a blend may or may not be miscible. Such a blend may or may not be phase separated. Such a blend may or may not contain one or more domain configurations, as determined from transmission electron spectroscopy, light scattering, x-ray scattering, and any other method known in the art. As used with respect to a chemical compound, unless specifically indicated otherwise, the singular includes all isomeric forms and vice versa (for example, "hexane", includes all isomers of hexane individually or collectively). The terms "compound" and "complex" are used interchangeably to refer to organic-, inorganic- and organometal compounds. The term "polymer" (and like terms) is a macromolecular compound prepared by reacting (i.e., polymerizing) monomers of the same or different type. "Polymer" includes homopolymers and copolymers.

Although the invention has been described in considerable detail by the preceding examples and references to the drawings, this detail is for the purpose of illustration and is not to be construed as a limitation upon the spirit and scope of the invention as it is described in the appended claims.

What is claimed is:

1. A composition comprising:
   20 to 80 weight percent polyvinyl chloride resin, based on the total weight of the composition;
   1 to 30 weight percent compatibilizer, based on the total weight of the composition; and
   5 to 60 weight percent biochemical plasticizers, based on the total weight of the composition, the biochemical plasticizers comprising (a) at least one acetylated component selected from an acetylated vegetable oil and an acetylated wax derived from a vegetable oil and (b) at least one epoxidized component selected from an epoxidized vegetable oil and an epoxidized ester of a vegetable-oil derived fatty acid, the acetylated component and the epoxidized component comprising at least 50 weight percent of the total plasticizer content of the composition.

2. The composition of claim 1 in which the composition is substantially free of phthalate-based plasticizers.

3. The composition of claim 1 in which the composition is substantially free of non-biochemical plasticizers.

4. The composition of claim 1 comprising at least 15 weight percent biochemical plasticizer based on the total weight of the composition.

5. The composition of claim 2 further comprising a thermoplastic elastomer.

6. The composition of claim 2 in which the compatibilizer comprises a chlorinated polyethylene.

7. The composition of claim 2 having a tensile elongation at break retention of at least 25% after heat-aging for 168 hours at 113° C., as determined by ASTM D 638.

8. The composition of claim 2 in which the composition exhibits a loop spew rating at 23° C. of slight or better, as determined by ASTM D 3291.

9. A wire or cable comprising a jacketing layer or an insulating layer comprising the composition of claim 2.

10. The composition of claim 1 wherein the acetylated component is acetylated castor wax.

11. The composition of claim 1 wherein the acetylated component is acetylated castor oil.

12. The composition of claim 1 wherein the acetylated component is acetylated castor wax and the epoxidized component is epoxidized soybean oil.

13. A composition consisting essentially of:
   20 to 80 weight percent polyvinyl chloride resin, based on the total weight of the composition;
   1 to 10 weight percent compatibilizer, based on the total weight of the composition, the compatibilizer comprising a chlorinated polyethylene;
   5 to 60 weight percent biochemical plasticizer, based on the total weight of the composition, the biochemical plasticizer comprising (a) at least one acetylated component selected from an acetylated of vegetable oil and an acetylated wax derived from a vegetable oil and (b) at least one epoxidized component selected from an epoxidized of vegetable oil and an epoxidized ester of a vegetable-oil derived fatty acid;
   0 to 40 weight percent of a thermoplastic elastomer, based on the total weight of the composition; and
   0 to 15 weight of percent of an additional component selected from the group consisting of a filler, an additive, and combinations thereof.

14. The composition of claim 13 wherein the biochemical plasticizer comprises acetylated castor wax and epoxidized soybean oil.

15. The composition of claim 1 comprising from 1 to 5 weight percent compatibilizer.

16. The composition of claim 13 comprising from 1 to 5 weight percent compatibilizer.

17. The composition of claim 1 wherein the weight ratio of acetylated component to epoxidized component is 50:50.

18. The composition of claim 13 wherein the weight ratio of acetylated component to epoxidized component is 50:50.

19. A composition comprising:
   20 to 80 weight percent polyvinyl chloride resin, based on the total weight of the composition;
   1 to 30 weight percent compatibilizer, based on the total weight of the composition, the compatibilizer comprising a chlorinated polyethylene;
   5 to 60 weight percent biochemical plasticizer, based on the total weight of the composition, the biochemical plasticizer consisting essentially of (a) at least one acetylated component selected from an acetylated vegetable oil and an acetylated wax derived from a vegetable oil and (b) at least one epoxidized component selected from an epoxidized vegetable oil and an epoxidized ester of a vegetable-oil derived fatty acid; and
   10 to 40 weight percent of a thermoplastic elastomer, based on the total weight of the composition,
   wherein the composition is free of phthalates.

* * * * *